US009172252B2

(12) United States Patent
Sugiyama (10) Patent No.: US 9,172,252 B2
(45) Date of Patent: Oct. 27, 2015

(54) POWER SUPPLY APPARATUS FOR ELECTRICALLY POWERED VEHICLE AND METHOD FOR CONTROLLING THE SAME

(75) Inventor: Yoshinobu Sugiyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 191 days.

(21) Appl. No.: 14/008,668

(22) PCT Filed: Apr. 21, 2011

(86) PCT No.: PCT/JP2011/059827
§ 371 (c)(1),
(2), (4) Date: Sep. 30, 2013

(87) PCT Pub. No.: WO2012/144045
PCT Pub. Date: Oct. 26, 2012

(65) Prior Publication Data
US 2014/0028256 A1 Jan. 30, 2014

(51) Int. Cl.
*H02J 7/00* (2006.01)
*B60L 1/00* (2006.01)
*B60L 7/22* (2006.01)
*B60L 11/12* (2006.01)
*B60L 11/18* (2006.01)
(Continued)

(52) U.S. Cl.
CPC . *H02J 7/00* (2013.01); *B60L 1/006* (2013.01); *B60L 7/22* (2013.01); *B60L 11/126* (2013.01); *B60L 11/1803* (2013.01); *B60L 11/1812* (2013.01); *B60L 11/1816* (2013.01); *B60L 11/1861* (2013.01); *B60L 11/1868* (2013.01); *B60L 11/1896* (2013.01); *B60L 2210/10* (2013.01); *B60L 2210/30* (2013.01); *B60L 2240/526* (2013.01); *B60L 2240/529* (2013.01); *B60L 2240/545* (2013.01); *B60L 2240/547* (2013.01); *B60L 2240/549* (2013.01); *Y02T 10/6217* (2013.01); *Y02T 10/7044* (2013.01); *Y02T 10/7066* (2013.01);
(Continued)

(58) Field of Classification Search
CPC ...................................................... Y02T 90/14
USPC .......................................................... 320/109
See application file for complete search history.

(56) References Cited

U.S. PATENT DOCUMENTS

2009/0103341 A1\* 4/2009 Lee et al. ...................... 363/124
2011/0187184 A1 8/2011 Ichikawa
(Continued)

FOREIGN PATENT DOCUMENTS

JP A-2009-225587 10/2009
JP A-2010-093891 4/2010
(Continued)

*Primary Examiner* — Edward Tso
*Assistant Examiner* — Johali Torres Ruiz
(74) *Attorney, Agent, or Firm* — Oliff PLC (57) ABSTRACT

If an external power supply is not connected to an electrically powered vehicle by a charging cable and there is a request to output electric power from an AC receptacle, a power generation mode is selected and a charger receives electric power from a main battery, converts it into alternating current electric power, and outputs it to a power line. In the power generation mode when an auxiliary machinery system is fed with electric power one of a first mode (a normal mode) and a second mode (a high-output mode) is selected depending on electric power used at the AC receptacle. In the normal mode, a main DC/DC converter is stopped, while an AC/DC converter is operated to generate auxiliary electric power. In the high-output mode, the main DC/DC converter is operated to generate auxiliary electric power, while the AC/DC converter is stopped.

10 Claims, 4 Drawing Sheets

(56) References Cited

U.S. PATENT DOCUMENTS

2012/0049792 A1* 3/2012 Crombez .................. 320/109
2012/0133204 A1   5/2012 Ang et al.
2012/0169281 A1   7/2012 Itagaki et al.

FOREIGN PATENT DOCUMENTS

| WO | 2009/116311 A1 | 9/2009 |
| WO | 2011/024285 A1 | 3/2011 |
| WO | WO 2011/036758 A1 | 3/2011 |

* cited by examiner

POWER SUPPLY APPARATUS FOR ELECTRICALLY POWERED VEHICLE AND METHOD FOR CONTROLLING THE SAME

TECHNICAL FIELD

The present invention relates to a power supply apparatus for an electrically powered vehicle and a method for controlling the same, and more specifically, a power supply apparatus for an electrically powered vehicle capable of generating alternating current electric power from the electric power of an in-vehicle power storage device.

BACKGROUND ART

An electric vehicle, a hybrid vehicle, or a fuel cell vehicle has been known as an electrically powered vehicle configured such that a traction motor can be driven using electric power from an in-vehicle power storage device represented by a rechargeable battery. For an electrically powered vehicle, a configuration for charging an in-vehicle power storage device by a power supply outside the vehicle (hereinafter also simply referred to as an "external power supply") has been proposed. Charging the power storage device by the external power supply will hereinafter also be simply referred to as "external charging".

Japanese Patent Laying-Open No. 2009-225587 (PTD 1) describes a configuration of an electrically powered vehicle equipped with a power storage device (a main battery) chargeable by an external power supply. PTD 1 describes that the electrically powered vehicle is provided with a receptacle for extracting alternating current electric power. The external charging is done via a power converter, which is capable of converting electric power bidirectionally, and hence receiving electric power from the main battery and converting it into alternate current electric power to allow the vehicle to generate electric power. If the external power supply is not connected to the vehicle, the vehicle can generate and output electric power through the receptacle.

CITATION LIST

Patent Document

PTD 1: Japanese Patent Laying-Open No. 2009-225587

SUMMARY OF INVENTION

Technical Problem

However, PTD 1 describes that the electrically powered vehicle supplies an auxiliary load system including an auxiliary battery with electric power via a single DC/DC converter. Accordingly, this requires that the DC/DC converter be designed to have an output rating to accommodate supplying auxiliary electric power while the vehicle travels. As such, when the external charging is done, i.e., when the auxiliary machinery system consumes relatively small electric power, the DC/DC converter will also be operated with the output rating that is excessively large for the electric power consumed. As a result, the DC/DC converter may cause electric power loss resulting in less efficient external charging.

Accordingly, the DC/DC converter that can accommodate charging while the vehicle is traveling, and, in addition thereto, a subconverter of a small capacity for feeding the auxiliary machinery system with electric power may also be introduced exclusively for the external charging. However, the subconverter will be connected to a path of the external charging, and accordingly, when the vehicle generates electric power, the receptacle may output electric power smaller by that which the subconverter outputs (i.e., by auxiliary electric power). As such, a vehicular power generation mode may be effected without sufficiently exploiting the power converter's output rating in feeding electric power through the receptacle.

The present invention has been made to overcome such a disadvantage, and an object of the present invention is to allow an electrically powered vehicle to generate alternating current electric power from the electric power of an in-vehicle power storage device, while efficiently and appropriately supplying auxiliary electric power depending on electric power used through a receptacle.

Solution to Problem

The present invention in one aspect provides a power supply apparatus for an electrically powered vehicle, including a main power storage device, a subpower storage device having an output voltage lower than that of the main power storage device, a charging inlet for electrically contacting an external power supply, first and second power lines, a receptacle, a charger, first and second power converters, and a control device. The main power storage device stores electric power input/output to/from an electric motor generating vehicular driving force. The first power line is connected to the subpower storage device and supplies auxiliary electric power for operating an auxiliary load. The second power line is electrically connected to the charging inlet. The receptacle is provided to extract alternating current electric power from the second power line. The charger is configured to perform bidirectional electric power conversion between the alternating current electric power on the second power line and direct current electric power input/output to/from the main power storage device. The first power converter is configured to receive the direct current electric power from the main power storage device to convert the received electric power into the auxiliary electric power for output to the first power line. The second power converter is configured to receive the alternate current electric power on the second power line to convert the received electric power into the auxiliary electric power for output to the first power line. The control device is configured to control the charger to convert the direct current electric power from the main power storage device into alternating current electric power for output to the second power line in a power generation mode allowing the receptacle to output alternating current electric power with the external power supply disconnected from the charging inlet. Furthermore, the control device controls the first and second power converters to generate the auxiliary electric power in the power generation mode with a first mode and a second mode switched based on electric power used from the receptacle, the first mode allowing the first power converter to operate to generate the auxiliary electric power, the second mode allowing the second power converter to operate to generate the auxiliary electric power.

Preferably, the control device selects the first mode when the electric power used is higher than a predetermined reference electric power.

Still preferably, the control device selects the second mode when the electric power used is lower than a predetermined reference electric power.

Furthermore, still preferably, the reference electric power is set based on a value of electric power of a value of a rated output electric power of the charger minus an output electric power rating of the second power converter.

Alternatively, still preferably, the reference electric power is set based on a value of electric power of an output electric power rating of the charger minus auxiliary electric power consumed.

The present invention in another aspect provides a method for controlling a power supply apparatus for an electrically powered vehicle having mounted therein a main power storage device for storing electric power input/output to/from an electric motor generating vehicular driving force, and a subpower storage device having an output voltage lower than that of the main power storage device, and the power supply apparatus includes a charging inlet for electrically contacting an external power supply, first and second power lines, a receptacle, a charger, and first and second power converters. The first power line is connected to the subpower storage device and supplies auxiliary electric power for operating an auxiliary load. The second power line is electrically connected to the charging inlet. The receptacle is configured to extract alternating current electric power from the second power line. The charger is configured to perform bidirectional electric power conversion between the alternating current electric power on the second power line and direct current electric power input/output to/from the main power storage device. The first power converter is configured to receive the direct current electric power from the main power storage device to convert the received electric power into the auxiliary electric power for output to the first power line. The second power converter is configured to receive the alternate current electric power on the second power line to convert the received electric power into the auxiliary electric power for output to the first power line. The method includes the steps of: controlling the charger to convert the direct current electric power from the main power storage device into alternating current electric power for output to the second power line in a power generation mode allowing the receptacle to output alternating current electric power with the external power supply disconnected from the charging inlet; selecting one of a first mode and a second mode, based on electric power used from the receptacle, in the power generation mode, the first mode allowing the first power converter to operate to generate the auxiliary electric power, the second mode allowing the second power converter to operate to generate the auxiliary electric power; and controlling the first power converter and the second power converter to generate the auxiliary electric power in accordance with a selected one of the first and second modes.

Preferably, in the step of selecting, the first mode is selected when the electric power used is higher than a predetermined reference electric power.

Furthermore, preferably, in the step of selecting, the second mode is selected when the electric power used is lower than a predetermined reference electric power.

Advantageous Effects of Invention

The present invention thus allows an electrically powered vehicle to generate alternating current electric power from the electric power of an in-vehicle power storage device, while efficiently and appropriately supplying auxiliary electric power depending on electric power used through a receptacle.

DESCRIPTION OF EMBODIMENTS

An embodiment of the present invention will hereinafter be described in detail with reference to the drawings. In the figures, identical or corresponding components are identically denoted and will not be described repeatedly in principle.

Figure 1:
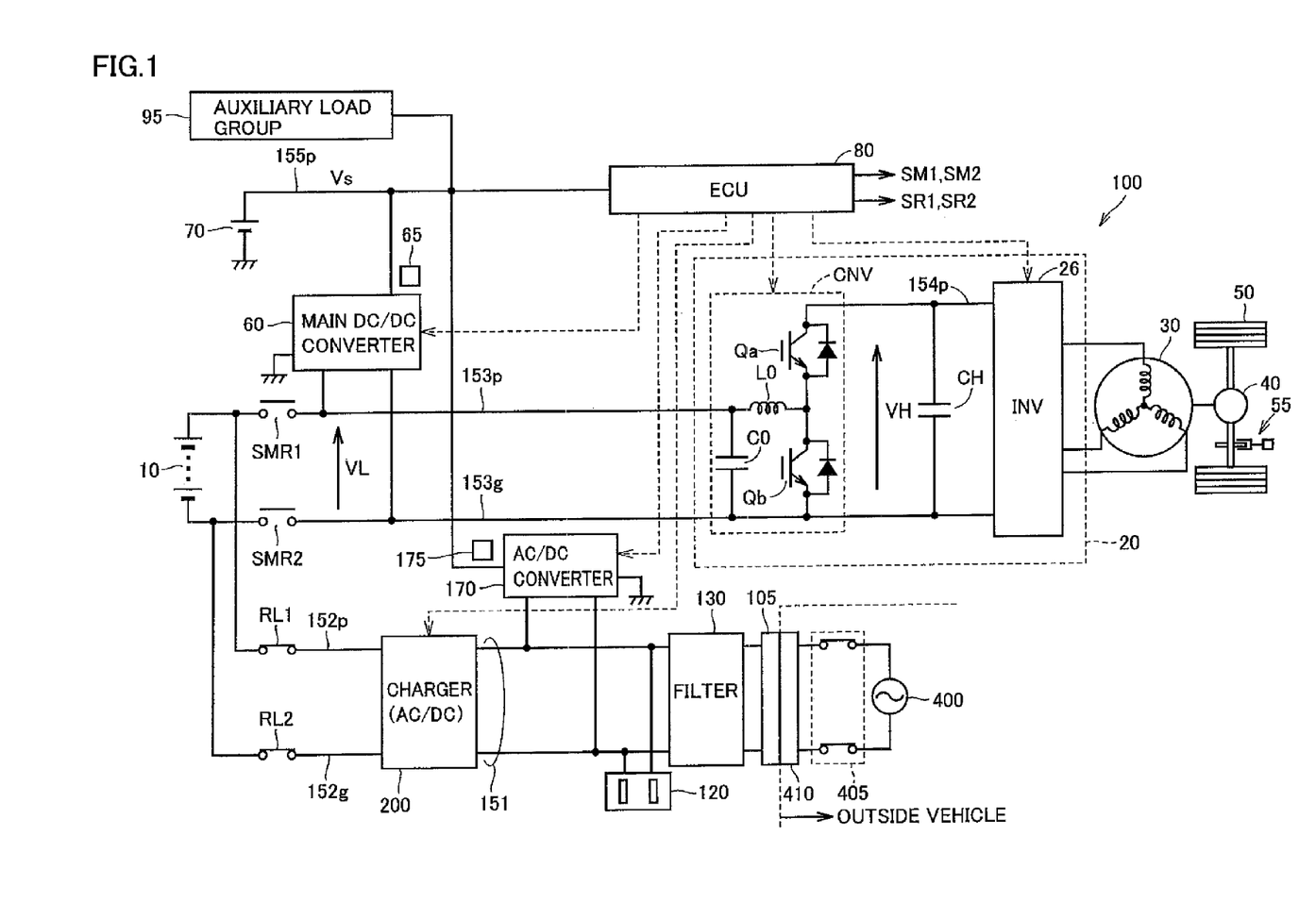
FIG. 1 is a block diagram showing an exemplary configuration of a power supply apparatus for an electrically powered vehicle in accordance with an embodiment of the present invention.

FIG. 1 is a block diagram showing an exemplary configuration of a power supply apparatus for an electrically powered vehicle in accordance with an embodiment of the present invention.

With reference to FIG. 1, an electrically powered vehicle 100 includes a main battery 10, a power control unit (PCU) 20, a motor generator 30, a power transmission gear 40, a driving wheel 50, a braking mechanism 55, and an electronic control unit (ECU) 80.

Main battery 10 is shown as an example of a "main power storage device", and is representatively configured of a rechargeable battery, such as a lithium ion battery or a nickel metal hydride battery. For example, main battery 10 outputs voltage for example of about 200 V. Alternatively, the main power storage device may be configured of an electric double layer capacitor, or a combination of a rechargeable battery and a capacitor.

PCU 20 converts electric power that is charged to/discharged from main battery 10 into electric power for controlling driving motor generator 30. For example, motor generator 30 is a permanent magnet type three-phase synchronous electric motor, and PCU 20 is configured to include an inverter 26.

Motor generator 30 outputs a torque which is in turn transmitted through power transmission gear 40, which is configured of a reduction gear, a power split device and/or the like, to the driving wheel and thus causes electrically powered vehicle 100 to travel. At the time of regenerative braking of electrically powered vehicle 100, motor generator 30 can generate electric power by rotational force of driving wheel 50. The generated electric power is then converted by PCU 20 into electric power for charging main battery 10.

Braking mechanism 55 generates mechanical braking force directed to a wheel. Braking mechanism 55 is representatively configured of a hydraulic brake that generates frictional braking force in accordance with hydraulic pressure supplied. When a brake pedal of electrically powered vehicle 100 is operated, the entire braking force corresponding to the operation of the brake pedal is ensured by a sum of the mechanical braking force from braking mechanism 55 and regenerative braking force from motor generator 30.

In a hybrid vehicle having an engine (not shown) in addition to motor generator 30, vehicular driving force necessary for electrically powered vehicle 100 is generated by a coordinated operation of the engine and motor generator 30. Here, it is also possible to charge main battery 10 using electric power generated by the engine's rotation.

That is, electrically powered vehicle 100 represents a vehicle equipped with a traction motor, and includes a hybrid vehicle in which vehicular driving force is generated by an engine and an electric motor, an electric vehicle and a fuel cell vehicle which are not equipped with an engine, and the like.

The configuration of electrically powered vehicle 100 shown in the figure minus motor generator 30, power transmission gear 40 and driving wheel 50 configures "the power supply apparatus for the electrically powered vehicle". A configuration of the power supply apparatus will hereinafter be described in detail.

Power control unit (PCU) 20 includes a converter CNV, a smoothing capacitor CH, and inverter 26.

Converter CNV is configured to perform direct current voltage conversion between direct current voltage VL across power lines 153p and 153g and direct current voltage VH across power lines 154p and 154g.

Power lines 153p, 153g are electrically connected to a positive electrode terminal and a negative electrode terminal of main battery 10 through system main relays SMR1 and SMR2, respectively. Smoothing capacitor CH is connected to power lines 154p, 154g and smoothes direct current voltage. Similarly, a smoothing capacitor C0 is connected to power lines 153p, 153g and smoothes direct current voltage VL.

Converter CNV is configured as a chopper circuit including power semiconductor switching elements Qa, Qb, a reactor L0, and smoothing capacitor C0, as shown in FIG. 1. In the present embodiment, IGBTs (Insulated Gate Bipolar Transistors) are shown as exemplary power semiconductor switching elements (hereinafter also simply referred to as "switching elements"). However, any elements that can be turned on/off as controlled, such as power metal oxide semiconductor (MOS) transistors, power bipolar transistors, or the like, can be used as the switching elements.

Anti-parallel diodes are connected to switching elements Qa and Qb, respectively, and therefore, converter CNV can perform bi-directional voltage conversion between power lines 153p and 154p. Alternatively, by fixing switching element Qa as an upper arm element in an ON-state while fixing switching element Qb as a lower arm element in an OFF-state, converter CNV can be operated to equalize power lines 154p and 153p in voltage (VH=VL).

Inverter 26 is a general three-phase inverter, and therefore, its detailed circuit configuration is not shown. For example, inverter 26 is configured such that an upper arm element and a lower arm element are arranged for each phase, and a connection point between the upper and lower arm elements of each phase is connected to a stator coil winding of the corresponding phase of motor generator 30.

When electrically powered vehicle 100 travels, inverter 26 has each switching element turned on/off, as controlled by ECU 80, whereby the direct current voltage on power line 154p is converted into three-phase alternate current voltage for supply to motor generator 30. At the time of a regenerative braking operation of electrically powered vehicle 100, inverter 26 has each switching element turned on/off, as controlled by ECU 80, such that the alternate current voltage from motor generator 30 is converted into direct current voltage for output to power line 154p.

ECU 80 is configured of an electronic control unit having a central processing unit (CPU) and a memory (not shown) incorporated therein, and is configured to follow a map and a program stored in the memory to perform an operation processing using values sensed by and received from various sensors. At least a portion of ECU 80 may be configured to perform a predetermined numerical/logical operation processing by means of hardware such as an electronic circuit. ECU 80 is comprehensively represented as a block having a control function applied when electrically powered vehicle 100 travels and when it is externally charged. ECU 80 operates as it receives power supply voltage of a low voltage system from a power line 155p.

The power supply apparatus for electrically powered vehicle 100 includes, as a configuration of the low voltage system (or auxiliary machinery system), a main DC/DC converter 60, an auxiliary battery 70, and power line 155p. Auxiliary battery 70 is connected to power line 155p. Auxiliary battery 70 is shown as one example of a "subpower storage device". For example, auxiliary battery 70 is a lead-acid battery. Auxiliary battery 70 outputs voltage, which corresponds to a power supply voltage Vs of the low voltage system. Power supply voltage Vs has a rating lower than voltage that main battery 10 outputs, and it is about 12 V for example.

Main DC/DC converter 60 has an output side connected to power line 155p. Main DC/DC converter 60 has an input side connected to power lines 153p, 153g. Main DC/DC converter 60 receives electric power from main battery 10 and converts it into auxiliary electric power (the level of power supply voltage Vs) for output to power line 155p. By this power conversion, the output voltage (direct current voltage VL) of main battery 10 is buck-boosted to power supply voltage Vs for the auxiliary machinery system. Main DC/DC converter 60 is representatively a switching regulator including a semiconductor switching element (not shown), and any known circuit configuration is applicable thereto.

A group of auxiliary loads 95 of the low voltage system is connected to power line 155p. Auxiliary load group 95 includes, for example, audio equipment, navigation equipment, and illumination equipment (a hazard lamp, a room lamp, a head lamp, and the like). The auxiliary load group consumes electric power as they operate as operated by a user.

Furthermore, the power supply apparatus for electrically powered vehicle 100 includes, as a configuration of an external charging system for main battery 10, a charging inlet 105, an AC receptacle 120, an LC filter 130, an AC/DC converter 170, a charger 200, and relays RL1, RL2.

Charging inlet 105 is connected to a charging plug 410 of a charging cable, which is in a state connected to external power supply 400, and is thereby electrically connected to external power supply 400. It is assumed that the charging cable has a relay 405 incorporated therein for cutting off a charging path of external power supply 400. Generally, external power supply 400 is a commercial alternate current power supply.

It is noted that the FIG. 1 configuration may be replaced with a configuration in which external power supply 400 and electrically powered vehicle 100 are contactlessly, electromagnetically coupled to supply electric power. Specifically, a primary coil may be provided for the external power supply and a secondary coil may be provided for the vehicle, and electric power may be supplied from external power supply 400 to electrically powered vehicle 100 by utilizing mutual inductance between the primary and secondary coils. Even when such external charging is performed, the configuration of LC filter 130 et seq. for converting electric power supplied from external power supply 400 can be used.

A power line 151 electrically interconnects charging inlet 105 and charger 200. LC filter 130 is interposed in and thus connected to power line 151 and removes a harmonic component of alternate current voltage.

Charger 200 receives alternate current voltage output from external power supply 400 and transmitted on power line 151, and converts it into direct current voltage for charging main battery 10. The converted, direct current voltage is output across power lines 152p and 152g. Here, the direct current voltage for power lines 152p and 152g is controlled to a voltage level suitable for charging main battery 10.

Relay RL1 is electrically connected between power line 152p and a positive electrode of main battery 10. Relay RL2 is electrically connected between power line 152g and a negative electrode of main battery 10.

Relays RL1, RL2 and system main relays SMR1, SMR2 are each representatively configured of an electromagnetic relay that is closed (or turned on) when an excitation circuit (not shown) supplies an excitation current and that is opened (or turned off) when the excitation circuit does not supply the excitation current. It is noted that any circuit element may be used as the relay or the system main relay, so long as it is a switch that can control conduction (ON)/non-conduction (OFF) of a conduction path.

ECU 80 generates control commands SM1, SM2 and SR1, SR2 to control turning on/off system main relays SMR1, SMR2 and relays RL1, RL2. In response to each of control commands SM1, SM2 and SR1, SR2, an excitation current for the corresponding system main relay or relay is generated, with auxiliary battery 70 serving as a power supply.

AC receptacle 120 is connected to power line 151. AC receptacle 120 is electrically connected to power line 151 for example when an operation switch (not shown) is turned on. Electric equipment (not shown) connected to AC receptacle 120 can thus operate using the alternate current electric power on power line 151. Note that a sensor 125 can be disposed to sense electric power output from AC receptacle 120, i.e., used electric power Pc at the AC receptacle.

When the charging cable is connected, alternate current electric power can be supplied from AC receptacle 120 using the electric power received from external power supply 400. Furthermore, configuring charger 200 of a bidirectional power converter allows it to receive electric power from main battery 10 and convert it into alternate current electric power to supply it via AC receptacle 120 when the charging cable is not connected. Hereinafter, a mode in which charger 200 operates in this way will also be referred to as a "power generation mode". On the other hand, a mode in which charger 200 operates to charge main battery 10 by the electric power received from the external power supply will also be referred to as a "charging mode".

Figure 2:
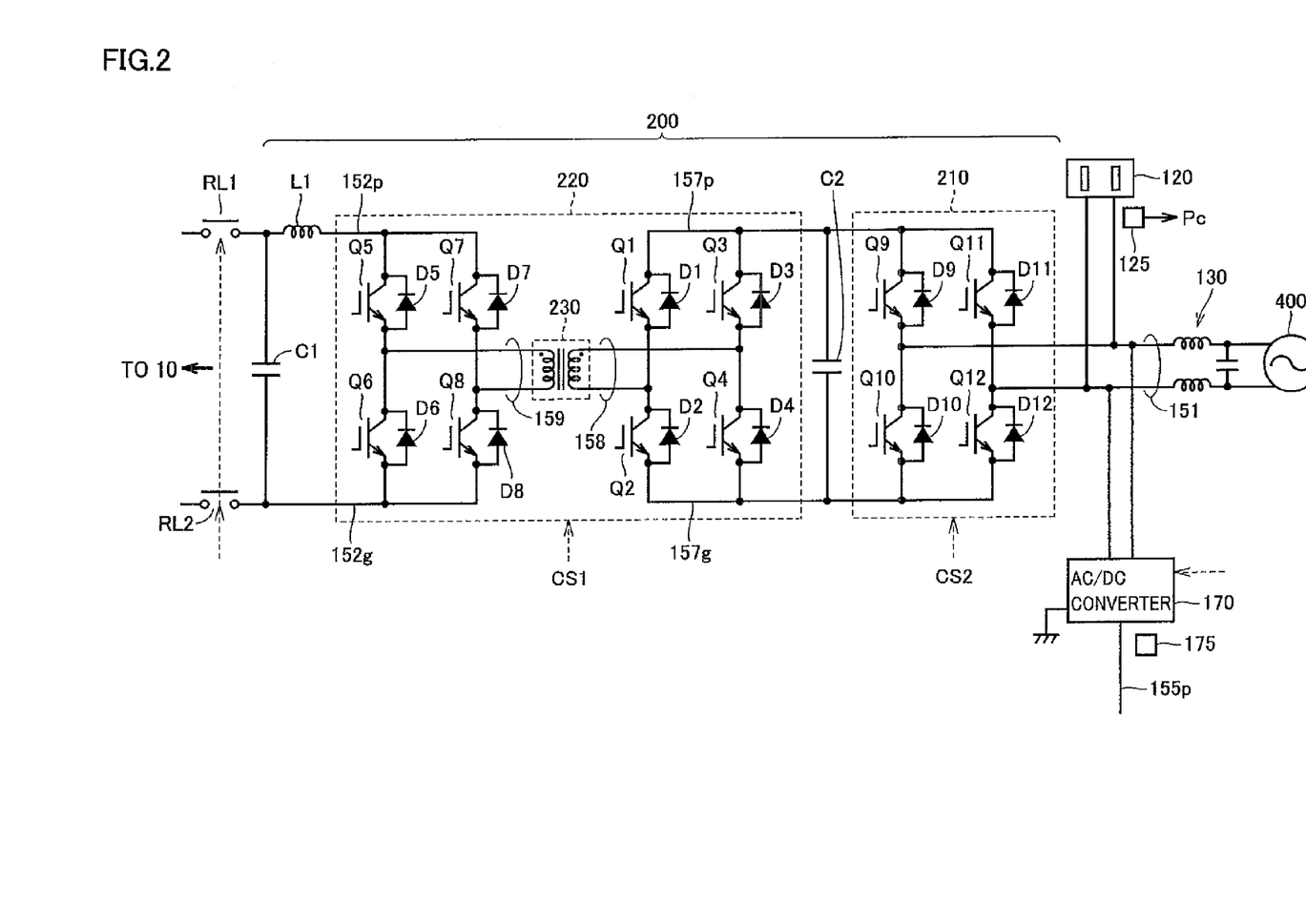
FIG. 2 is a circuit diagram for illustrating an exemplary configuration of a charger shown in FIG. 1.

FIG. 2 is a circuit diagram for illustrating an exemplary configuration of charger 200 shown in FIG. 1.

With reference to FIG. 2, charger 200 includes a power conversion unit 210, a power conversion unit 220, a smoothing reactor L1, and smoothing capacitors C1, C2.

Power conversion unit 210 includes power semiconductor switching elements Q9 to Q12. Anti-parallel diodes D9 to D12 are disposed for switching elements Q9 to Q12, respectively.

Switching elements Q9 to Q12 configure a full bridge circuit (hereinafter also referred to as the first full bridge circuit) between power line 151 and power lines 157p, 157g. Switching elements Q9 to Q12 are turned on/off as controlled in response to a control signal CS2 issued from ECU 80 (FIG. 1).

Power conversion unit 220 includes switching elements Q1 to Q4 and Q5 to Q8, and an isolation transformer 230. Anti-parallel diodes D1 to D8 are connected to switching elements Q1 to Q8, respectively. Switching elements Q1 to Q8 are turned on/off as controlled in response to a control signal CS1 issued from ECU 80.

Switching elements Q1 to Q4 configure a full bridge circuit (hereinafter also referred to as the second full bridge circuit) between power lines 157p, 157g and a power line 158. Switching elements Q5 to Q8 configure a full bridge circuit (hereinafter also referred to as the third full bridge circuit) between a power line 159 and power lines 152p, 152g.

Each of the full bridge circuits in power conversion units 210, 220 can perform bi-directional AC/DC power conversion as the switching elements are turned on/off as controlled, as is well known. It is also known that direct current voltage (current) or alternate current voltage (current) can also be controlled in level by controlling a duty ratio of the switching elements in controlling turning on/off them.

Isolation transformer 230 has a primary side to which power line 158 is connected, and a secondary side to which power line 159 is connected. As is well known, isolation transformer 230 is configured to convert alternate current voltage in accordance with the number of turns while electrically isolating the primary and secondary sides from each other.

Smoothing capacitor C2 smoothes the direct current voltage on power lines 157p, 157g. Smoothing capacitor C1 and smoothing reactor L1 smooth the direct current voltage and direct current on power lines 152p, 152g.

Hereinafter, an operation of charger 200 will be described in greater detail. Charger 200 performs electric power conversion in the charging mode, as follows:

In the charging mode, ECU 80 turns on relays RL1, RL2. Further, once a condition is satisfied for permitting the external charging, relay 405 (see FIG. 1) within the charging cable is turned on. Thus, power line 151 receives alternate current voltage from external power supply 400.

The first full bridge circuit (Q9 to Q12) of power conversion unit 210 converts the alternate current voltage on power line 151 into direct current voltage for output to power lines 157p, 157g. Here, power conversion unit 210 controls AC/DC conversion to improve a power factor of the electric power supplied from external power supply 400. That is, power conversion unit 210 preferably also operates as a power factor correction (PFC) circuit in the external charging.

Generally, the voltage on power lines 157p, 157g in the charging mode is controlled by power conversion unit 210 to direct current voltage higher than an amplitude of the alternate current voltage received from external power supply 400.

In power conversion unit 250, the second full bridge circuit (Q1 to Q4) converts the direct current voltage on power lines 157p, 157g into high-frequency alternate current voltage for output to power line 158. The high-frequency alternate current voltage that has been output on power line 158 is transformed in accordance with a ratio of turns of the primary and secondary sides of isolation transformer 230 for output to power line 159.

The third full bridge circuit (Q5 to Q8) converts the high-frequency alternate current voltage that has been output on power line 159 into direct current voltage for output to power lines 152p, 152g. The direct current voltage for power lines 152p, 152g is controlled by controlling turning on/off switching elements Q1 to Q8 configuring the second and third full bridge circuits.

In the charging mode, relays RL1, RL2 are turned on, and accordingly, main battery 10 is charged with the direct current voltage on power lines 152p, 152g.

By feedback control of output voltage and/or output current, charger 200 outputs direct current electric power for charging main battery 10 in accordance with a charging command issued in the external charging. The charging command is set in accordance with a state of main battery 10, for example, SOC (State Of Charge) and temperature. Then, at the completion of the external charging, ECU 80 turns off relays RL1, RL2.

eAC/DC converter 170 is connected to a path closer to AC receptacle 120 than charger 200 (in the example of FIG. 1, it is connected to power line 151). AC/DC converter 170 converts the alternate current voltage on power line 151 into auxiliary electric power (the level of power supply voltage Vs) for output to power line 155*p*. AC/DC converter 170 may be arranged integrally with charger 200. As well as main DC/DC converter 60, AC/DC converter 170 is configured of a switching regulator including a semiconductor switching element (not shown), and any known circuit configuration can be applied thereto.

Main DC/DC converter 60 and DC/DC converter 170 are provided with sensors 65 and 175, respectively, to sense output electric power. Generally, main DC/DC converter 60 and AC/DC converter 170 are configured as a constant voltage regulator that outputs constant voltage in accordance with a voltage command value. Therefore, by providing as sensors 65 and 175 a current sensor for sensing an output current, the electric power output from each converter can be sensed.

Charger 200 in the power generation mode performs electric power conversion opposite to that in the charging mode. Specifically, voltage output from main battery 10 and transmitted to power lines 152*p*, 152*g* by turning on relays RL1, RL2 is converted by the third full bridge circuit (Q5 to Q8) into high-frequency alternate current voltage for output to power line 159. The high-frequency alternate current voltage transmitted from power line 159 to power line 158 by isolation transformer 230 is then converted by the second full bridge circuit (Q1 to Q4) into direct current voltage for output to power lines 157*p*, 157*g*. The first full bridge circuit (Q9 to Q12) in power conversion unit 210 then converts the direct current voltage on power lines 157*p*, 157*g* into alternate current voltage for output to power line 151. Thus, in the power generation mode, alternating current electric power can be output from AC receptacle 120 without a charging cable connecting external power supply 400 to electrically powered vehicle 100.

Again with reference to FIG. 1, how the power supply apparatus operates when: the vehicle travels; the vehicle is externally charged (i.e., in the charging mode); and the vehicle generates electric power (i.e., is in the power generation mode), will be described.

When electrically powered vehicle 100 travels, system main relays SMR1, SMR2 are turned on. Consequently, the voltage output from main battery 10 is transmitted to power lines 153*p*, 153*g* by way of system main relays SMR1, SMR2 turned on. That is, the electric power on power lines 153*p*, 153*g* electrically connected to main battery 10 is used by PCU 20 to control driving motor generator 30.

When the vehicle travels, relays RL1, RL2 are turned off. Thus by relays RL1, RL2 turned off an external charging configuration including charger 200 can be electrically disconnected from main battery. 10 and power lines 153*p*, 153*g*.

When the vehicle travels, ECU80 and auxiliary load group 95 consume electric power, which is supplied by main DC/DC converter 60. On the other hand, AC/DC converter 170 is stopped.

In the charging mode, relays RL1, RL2 are turned on, while system main relays SMR1, SMR2 are turned off. Then, by way of relays RL1, RL2 turned on, main battery 10 is charged with the direct current voltage obtained by converting the alternate current electric power that is received from external power supply 400 by charger 200.

Further, by system main relays SMR1, SMR2 turned off, power lines 153*p*, 153*g* are electrically disconnected from charger 200 and main battery 10. Therefore, the voltage output from main battery 10 (i.e., direct current voltage VL) is not applied to equipment of a high voltage system including PCU 20, and the equipment's components can be prevented from having a durable lifetime reduced by the external charging.

As for the low voltage system (the auxiliary machinery system), since AC/DC converter 170 is activated at the time of the external charging, auxiliary electric power can be supplied to power line 155*p*, even though system main relays SMR1, SMR2 are turned of Thereby, main DC/DC converter 60 can be stopped. In other words, in the charging mode, main DC/DC converter 60 is stopped, while power supply voltage Vs for the low voltage system is generated by AC/DC converter 170, thereby achieving more efficient external charging.

Note that AC/DC converter 170 is designed to have an electric power capacity (or an output rating) so as to cover electric power normally consumed by the auxiliary machinery system (or the low voltage system) in the external charging. Therefore, the output rating of AC/DC converter 170 (for example, an output electric power rating of about 100 W) can be reduced below the output rating of main DC/DC converter 60, which needs to manage electric power consumed by ECU 80 and auxiliary load group 95 while the vehicle travels (for example, an output electric power rating of about several kW).

The electric power that is consumed by auxiliary load group 95 is supplied by a sum of electric power output from main DC/DC converter 60 or AC/DC converter 170 and electric power charged to/discharged from auxiliary battery 70.

In the power generation mode, relays RL1 and RL2 are turned on. Then, charger 200 receives direct current electric power from main battery 10, converts it into alternating current electric power (preferably, alternating current electric power equivalent to external power supply 400), and outputs it to power line 151. This alternating current electric power can be supplied from AC receptacle 120.

In the present embodiment the power supply apparatus for the electrically powered vehicle operates to feed electric power to the low voltage system (the auxiliary machinery system) in the power generation mode such that a normal mode (a first mode) that prioritizes efficiency and a high-output mode (a second mode) that increases electric power output from the AC receptacle are switched. Main DC/DC converter 60 corresponds to a "first power converter", and AC/DC converter 170 corresponds to a "second power converter".

ECU 80, in the normal mode, as well as in the charging mode, turns off system main relays SMR1 and SMR2 and stops main DC/DC converter 60. Then, ECU 80 operates AC/DC converter 170 to supply auxiliary electric power.

In contrast, ECU 80 in the high-output mode turns on system main relays SMR1 and SMR2 in addition to relays RL1 and RL2. Furthermore, ECU 80 operates main DC/DC converter 60, while ECU 80 stops AC/DC converter 170. Thus, similarly as done when the vehicle travels, auxiliary electric power is supplied by main DC/DC converter 60.

In the normal mode, system main relays SMR1 and SMR2 are turned off, and main DC/DC converter 60 is stopped. Thus by an AC/DC converter of a small capacity a limited loss can be achieved and auxiliary electric power can be generated efficiently.

In the normal mode, however, the electric power that is input to AC/DC converter 170 is branched from that output from charger 200 and is used for feeding electric power to the auxiliary machinery system. Accordingly, the electric power that can be used at AC receptacle 120 is smaller than the output rating of charger 200 (for example, an output electric power rating of about 2 kW). This is a problem in maximizing electric power output from AC receptacle 120.

In the high-output mode, in contrast, system main relays SMR1 and SMR2 are turned on and main DC/DC converter 60 of large capacity operates, which provides larger loss than in the normal mode. However, AC/DC converter 170 stops, and charger 200 outputs electric power without electric power branched for feeding the auxiliary machinery system with electric power. Accordingly, the electric power that can be used at AC receptacle 120 is expanded to the output rating of charger 200 (for example, an output electric power rating of about 2 kW). That is, the electric power output from AC receptacle 120 can be maximized.

Figure 3:
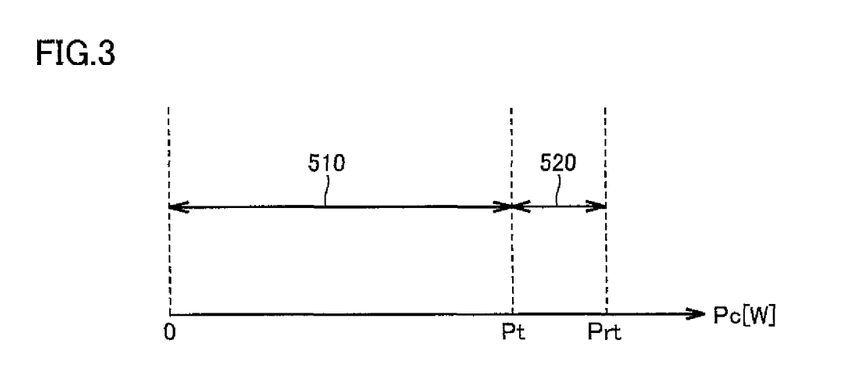
FIG. 3 is a conceptual diagram for illustrating a relationship between electric power used through a receptacle and selecting a mode for an auxiliary power feed system.

FIG. 3 is a conceptual diagram for illustrating a relationship between electric power used at the receptacle and selecting a mode for an auxiliary power feed system.

With reference to FIG. 3, when electric power Pc used at AC receptacle 120, as sensed by sensor 125, falls within a range 510 lower than a reference electric power Pt, the normal mode is selected. On the other hand, when electric power used Pc falls within a range 520 higher than reference electric power Pt, the high-output mode is selected. As a result, in the high-output mode, electric power that is used Pc can be increased to an output electric power rating Prt of charger 200.

Reference electric power Pt can be set based on a value of electric power of the output electric power rating (Prt) of charger 200 minus that of AC/DC converter 170. Alternatively, reference electric power Pt can be set based on a value of electric power of the output electric power rating of charger 200 minus the current electric power consumption of the auxiliary machinery system. The auxiliary machinery system's current electric power consumption can be electric power output from AC/DC converter 170 (in the normal mode) or main DC/DC converter 60 (in the high-output mode) currently used.

Figure 4:
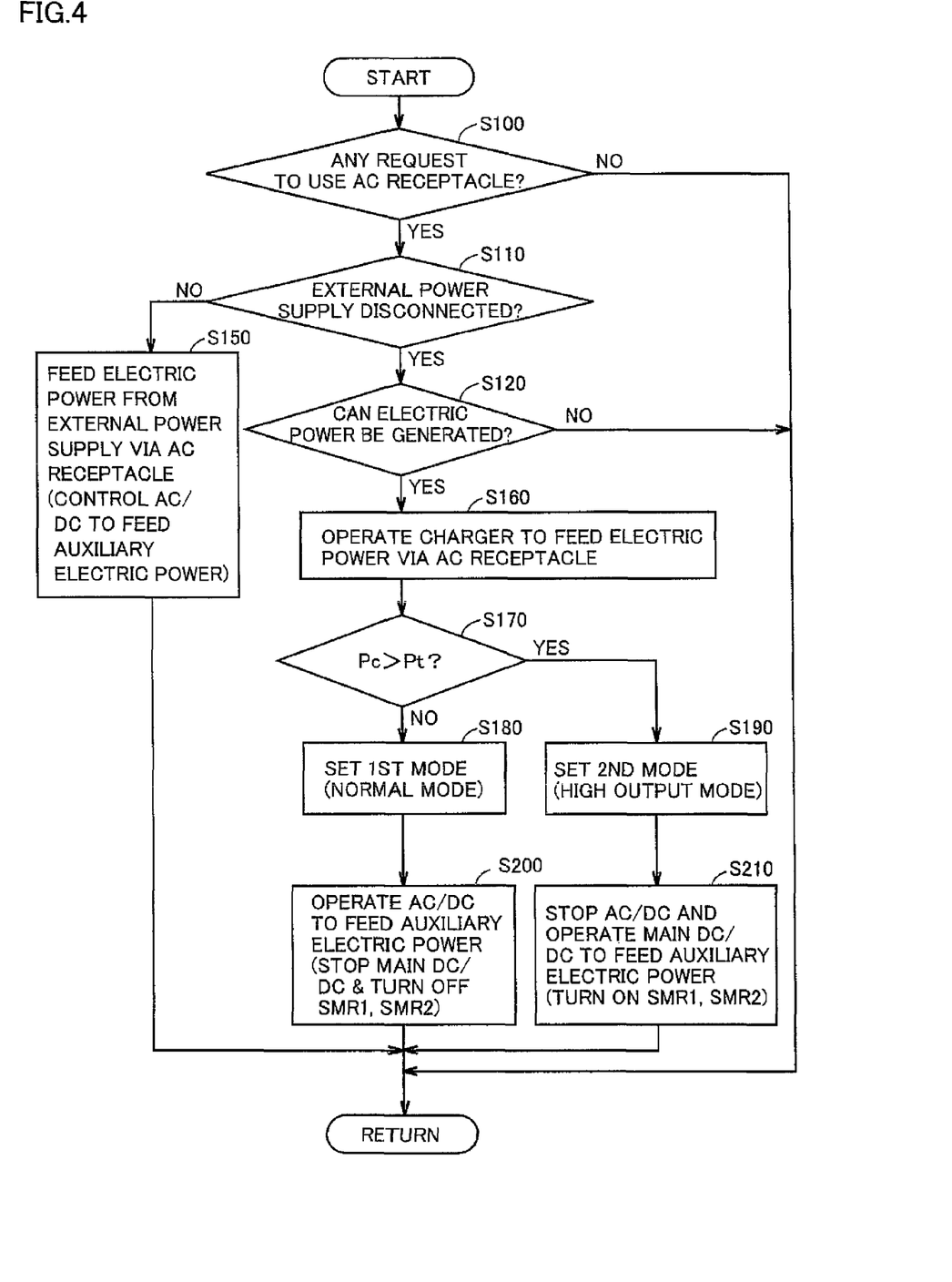
FIG. 4 is a flowchart for illustrating a control operation for an auxiliary power feed system in the power supply apparatus for the electrically powered vehicle in accordance with the embodiment of the present invention when the vehicle generates electric power.

FIG. 4 is a flowchart for illustrating a control operation for the auxiliary power feed system in the power supply apparatus for the electrically powered vehicle in accordance with the embodiment of the present invention while the vehicle generates electric power. The control processing shown in FIG. 4 is performed by ECU 80 periodically as predetermined. The control processing at each step shown in FIG. 4 is performed by means of hardware processing and/or software processing by ECU 80.

With reference to FIG. 3, ECU 80 in Step S100 detects whether there is a request to use AC receptacle 120. For example, ECU 80 determines that there is a request to do so (YES in S100) when a switch (not shown) is turned on to indicate feeding electric power from AC receptacle 120.

Otherwise (NO in S100), the control processing described hereinafter is not performed.

When there is a request to use AC receptacle 120 (YES in S100), ECU 80 proceeds to Step S110 to determine whether external power supply 400 is not connected to charging inlet 105 by a charging cable. For example, the determination of Step S110 is performed based on a signal which indicates the charging cable's connection state. When the external power supply is connected (NO in S110), ECU 80 proceeds to Step S150 to control the power supply apparatus to output from AC receptacle 120 the electric power received from external power supply 400. In other words, relays RL1 and RL2 are turned off and charger 200 is also stopped. Then, main DC/DC converter 60 is stopped and AC/DC converter 170 operates to generate auxiliary electric power.

When the external power supply is disconnected (YES in S110), ECU 80 proceeds to Step S120 to determine whether a state allowing electric power to be generated is currently established. For example, a state of main battery 10 (the battery's state of charge (SOC), temperature, and the like), whether charger 200 has defect, and the like, are confirmed in Step S120.

If the state allowing electric power to be generated is currently established (YES in S120), ECU 80 proceeds to Step S160 to operate charger 200 to output electric power from AC receptacle 120. In other words, the power generation mode is selected. On the other hand, if a state disallowing electric power to be generated is established (No in S120), ECU 80 does not proceed to Step S160 and ends the process. In other words, AC receptacle 120 does not output electric power.

ECU 80, in the power generation mode, further proceeds to Step S170 to compare electric power Pc currently used at AC receptacle 120 with reference electric power Pt. If Pc<Pt (NO in S170) ECU 80 proceeds to Step S180 to select the normal mode (the first mode). If Pc>Pt (YES in S170) ECU 80 proceeds to Step S190 to select the high output mode (the second mode).

In the normal mode, ECU 80 proceeds to Step S200 to turn on relays RL1, RL2 and operate AC/DC converter 170 to generate auxiliary electric power. At the time, main DC/DC converter 60 stops and system main relays SMR1 and SMR2 are turned off.

In contrast, ECU 80 in the high-output mode proceeds to Step S210 to stop AC/DC converter 170 and operate main DC/DC converter 60 to generate auxiliary electric power. At the time, system main relays SMR1 and SMR2 are turned on and relays RL1 and RL2 are turned off.

When electrical equipment of large capacity is connected to AC receptacle 120 and AC receptacle 120 uses electric power Pc larger than reference electric power Pt, the normal mode is switched to the high-output mode and auxiliary electric power is thus generated. Electric power larger than in the normal mode can be output from AC receptacle 120. Specifically, AC receptacle 120 can output electric power increased to the output rating of charger 200.

On the other hand, if electric power used Pc continues to be lower than reference electric power Pt for a period of time constantly, the normal mode is selected. Thereby, if AC/DC converter 170 is operated to generate auxiliary electric power and the electric power that is used at AC receptacle 120 can nevertheless be ensured, auxiliary electric power is generated with efficiency prioritized.

To prevent the selection between the normal mode and the high output mode from being frequently switched, it is preferable that reference electric power for determining whether to switch the normal mode to the high-output mode and reference electric power for determining whether to switch the normal mode to the high-output mode have hysteresis.

The power supply apparatus for the electrically powered vehicle in the present embodiment thus allows an electrically powered vehicle to generate alternating current electric power from the electric power of an in-vehicle power storage device, while efficiently and appropriately supplying auxiliary electric power depending on electric power used through a receptacle.

Furthermore, in the power supply apparatus for the electrically powered vehicle according to the present embodiment and its modifications, the components subsequent to power lines 153$p$, 153$g$ (a vehicular travelling system) are not limited to those shown in the figures. That is, as has been described above, the present invention is applicable to electrically powered vehicles equipped with traction motor(s), such as an electric vehicle, a hybrid vehicle, a fuel cell vehicle, and the like, without limitations on the number of traction motors and the configuration of the driving system. Furthermore, charger 200 can also be provided in any configuration that allows equivalent electric power conversion.

It should be understood that the embodiments disclosed herein are illustrative and non-restrictive in any respect. The scope of the present invention is defined by the terms of the claims, rather than by the foregoing description, and is intended to include any modifications within the scope and meaning equivalent to the terms of the claims.

INDUSTRIAL APPLICABILITY

The present invention is applicable to electrically powered vehicles that can generate alternating current electric power from the electric power of an in-vehicle power storage device.

REFERENCE SIGNS LIST

10: main battery, 20: PCU, 26: inverter, 30: motor generator, 40: motive power transmission gear, 50: driving wheel, 55: braking mechanism, 60: main DC/DC converter, 65, 125, 175: sensor, 70: auxiliary battery, 95: auxiliary load group, 100: electrically powered vehicle, 105: charging inlet, 120: AC receptacle, 130: LC filter, 151, 152$p$, 152$g$, 153$p$, 153$g$, 154$p$, 155$p$, 157$p$, 157$g$, 158, 159: power line, 170: AC/DC converter, 200: charger, 210, 220, 250: power conversion unit, 230: isolation transformer, 400: external power supply, 405: relay (charging cable), 410: charging plug, C0, C1, C2, CH: smoothing capacitor, CNV: converter, CS1, CS2: control signal (charger), D1 to D12: anti-parallel diode, L0, L1: reactor, Pc: electric power used (AC receptacle), Prt: rating, Pt: reference electric power, Q1 to Q12, Qa, Qb: power semiconductor switching element, RL1, RL2: relay, SM1, SM2, SR1, SR2: control command (relay), SMR1, SMR2, SMR1: system main relay, VH, VL: direct current voltage; Vs: power supply voltage.

The invention claimed is:

1. A power supply apparatus for an electrically powered vehicle, comprising:
   a main power storage device for storing electric power input/output to/from an electric motor generating vehicular driving force;
   a subpower storage device having an output voltage lower than that of said main power storage device;
   a first power line connected to said subpower storage device, for supplying auxiliary electric power for operating an auxiliary load;
   a charging inlet for electrically contacting an external power supply;
   a second power line electrically connected to said charging inlet;
   a receptacle for extracting alternating current electric power from said second power line;
   a charger for performing bidirectional electric power conversion between the alternating current electric power on said second power line and direct current electric power input/output to/from said main power storage device;
   a first power converter for receiving the direct current electric power from said main power storage device to convert the received electric power into said auxiliary electric power for output to said first power line;
   a second power converter for receiving the alternate current electric power on said second power line to convert the received electric power into said auxiliary electric power for output to said first power line; and
   a control device for controlling said charger to convert the direct current electric power from said main power storage device into alternating current electric power for output to said second power line in a power generation mode allowing said receptacle to output alternating current electric power with said external power supply disconnected from said charging inlet,
   said control device controlling said first and second power converters to generate said auxiliary electric power in said power generation mode with a first mode and a second mode switched based on electric power used from said receptacle, said first mode allowing said first power converter to operate to generate said auxiliary electric power, said second mode allowing said second power converter to operate to generate said auxiliary electric power.

2. The power supply apparatus for an electrically powered vehicle according to claim 1, wherein said control device selects said first mode when said electric power used is higher than a predetermined reference electric power.

3. The power supply apparatus for an electrically powered vehicle according to claim 2, wherein said reference electric power is set based on a value of electric power of a value of a rated output electric power of said charger minus an output electric power rating of said second power converter.

4. The power supply apparatus for an electrically powered vehicle according to claim 2, wherein said reference electric power is set based on a value of electric power of an output electric power rating of said charger minus a consumption of said auxiliary electric power at present.

5. The power supply apparatus for an electrically powered vehicle according to claim 1, wherein said control device selects said second mode when said electric power used is lower than a predetermined reference electric power.

6. The power supply apparatus for an electrically powered vehicle according to claim 5, wherein said reference electric power is set based on a value of electric power of a value of a rated output electric power of said charger minus an output electric power rating of said second power converter.

7. The power supply apparatus for an electrically powered vehicle according to claim 5, wherein said reference electric power is set based on a value of electric power of an output electric power rating of said charger minus a consumption of said auxiliary electric power at present.

8. A method for controlling a power supply apparatus for an electrically powered vehicle having mounted therein a main power storage device for storing electric power input/output to/from an electric motor generating vehicular driving force, and a subpower storage device having an output voltage lower than that of said main power storage device, said power supply apparatus including:
   a first power line connected to said subpower storage device for supplying auxiliary electric power for operating an auxiliary load;
   a charging inlet for electrically contacting an external power supply;
   a second power line electrically connected to said charging inlet;
   a receptacle for extracting alternating current electric power from said second power line;
   a charger for performing bidirectional electric power conversion between the alternating current electric power on said second power line and direct current electric power input/output to/from said main power storage device;
   a first power converter for receiving the direct current electric power from said main power storage device to convert the received electric power into said auxiliary electric power for output to said first power line; and a second power converter for receiving the alternate current electric power on said second power line to convert the received electric power into said auxiliary electric power for output to said first power line, the method comprising the steps of:

controlling said charger to convert the direct current electric power from said main power storage device into alternating current electric power for output to said second power line in a power generation mode allowing said receptacle to output alternating current electric power with said external power supply disconnected from said charging inlet;

selecting one of a first mode and a second mode, based on electric power used from said receptacle, in said power generation mode, said first mode allowing said first power converter to operate to generate said auxiliary electric power, said second mode allowing said second power converter to operate to generate said auxiliary electric power; and controlling said first power converter and said second power converter to generate said auxiliary electric power in accordance with a selected one of said first and second modes.

9. The method for controlling a power supply apparatus for an electrically powered vehicle according to claim 8, wherein in the step of selecting, said first mode is selected when said electric power used is higher than a predetermined reference electric power.

10. The method for controlling a power supply apparatus for an electrically powered vehicle according to claim 8, wherein in the step of selecting said second mode is selected when said electric power used is lower than a predetermined reference electric power.

* * * * *